United States Patent
Jung et al.

(10) Patent No.: US 7,900,217 B2
(45) Date of Patent: Mar. 1, 2011

(54) DYNAMIC DLL CYCLE RESOLUTION

(75) Inventors: Kenneth M. Jung, Seattle, WA (US); Arun Kishan, Bellevue, WA (US); Neill M. Clift, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/693,092

(22) Filed: Mar. 29, 2007

(65) Prior Publication Data
US 2008/0244550 A1    Oct. 2, 2008

(51) Int. Cl.
*G06F 13/00* (2006.01)
(52) U.S. Cl. ............... 719/331; 719/332; 717/162; 717/163
(58) Field of Classification Search .......... 719/331, 719/332; 717/162, 163
See application file for complete search history.

(56) References Cited

U.S. PATENT DOCUMENTS

| | | | |
|---|---|---|---|
| 5,375,241 A | 12/1994 | Walsh | |
| 5,561,800 A | 10/1996 | Sabatella | |
| 5,708,811 A | 1/1998 | Arendt | |
| 6,003,095 A | 12/1999 | Pekowski | |
| 6,141,698 A | 10/2000 | Krishnan | |
| 6,499,137 B1 | 12/2002 | Hunt | |
| 6,658,658 B1 | 12/2003 | Jones | |
| 6,769,126 B1 * | 7/2004 | Pekowski | 719/331 |
| 7,100,172 B2 | 8/2006 | Voellm | |
| 2004/0123308 A1 | 6/2004 | Idoni | |
| 2005/0144608 A1 | 6/2005 | Oyama | |
| 2005/0262522 A1 * | 11/2005 | Gassoway | 719/331 |
| 2009/0199171 A1 * | 8/2009 | Roe et al. | 717/163 |

OTHER PUBLICATIONS

Grier, M., "The NT DLL Loader: Dynamic Unloads," Jun. 18, 2005, [retrieved Feb. 9, 2007].
Thomas, R., and B. Reddy, "Dynamic Linking in Linux and Windows, Part Two," Aug. 15, 2006, [retrieved Feb. 9, 2007].

* cited by examiner

*Primary Examiner*—Andy Ho
(74) *Attorney, Agent, or Firm*—Wolf, Greenfield & Sacks, P.C.

(57) ABSTRACT

Deterministically resolving cycles in a library tree is disclosed. Resolving cycles supports certain processes such as safe library initialization. Cycles in the library tree are identified; at least one soft link in each identified cycle is identified; and the at least one soft link in each identified cycle is broken. If a cycle has no soft links, notification is provided indicating that the cycle cannot be broken. Identifying at least one soft link in each identified cycle comprises, for each link in the cycle, determining the dependent and supporting libraries; and determining if one or more functions in the supporting library are required for initializing the dependent library.

20 Claims, 4 Drawing Sheets

DYNAMIC DLL CYCLE RESOLUTION

BACKGROUND

Computing devices perform tasks by executing computer instructions. A set of computing instructions for performing a particular task form a function. A set of functions that interact for performing related tasks form an application. Two or more different applications may need to use the same function to perform the same particular task. While it is possible to include the same function's computing instructions in each of the different applications, it is more efficient for each application to use the same function. By using the same function, less memory is used to store instructions, and modifications to the function need only be made in one place.

To allow more than one application to use the same functions, a library of functions, i.e., a library, is formed. Typically, a function's computer instructions and a reference to the computer instructions is placed in the library. This is done for each of the functions in a library. An application uses a function in a library, i.e., a library function, by calling the function using the reference.

Functions may call other functions in the same library. Functions may also call functions in another library. Hence, it is possible for a library to depend on another library. For example, an application may depend on library A that depends on library B which depends on library C. In order to properly load and initialize the application, libraries A, B, and C must be loaded and initialized in a way that prevents the functions in the libraries from being called before the libraries are properly prepared. If a function in a library is called before the library containing the function is properly prepared, the function and/or the data used by the function may be in an indeterminate state. A function and/or data that is in an indeterminate state can cause, for example, the function to overwrite random memory locations that, in turn, can cause further malfunctions that are often difficult to detect. To ensure that the libraries are properly prepared, it is preferable that in the above example first library C is loaded and initialized, then library B, next library A, and finally the application is loaded and initialized.

Two libraries may have a "dependency relationship" or "dependency" if the first of the two libraries depends on the second library, i.e., if the first library uses functions in the second library. The dependency between the two libraries can be represented in software by a link. The dependencies in a set of libraries, such as the set of libraries described above, can be described by a dependency tree comprising a plurality of links. Using the above-described set of libraries as an example, in a dependency tree describing the libraries, the application has a link to library A which has a link to library B which has a link to library C.

It is also possible for libraries to be co-dependent. For example, if library B depends library C and library C depends on library B, libraries B and C are co-dependent. That is, there are two links between libraries B and C, which creates a cycle. A cycle is produced if, directly or indirectly, a supporting library for another library is also a dependent library. In the case of a cycle, the order in which the libraries are initialized is not clear. A traditional way to resolve the described loading problem is to break the cycle by arbitrarily choosing one of the libraries to load and initialize first.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Deterministically resolving cycles in a library tree to enable safe library initialization is disclosed. Cycles in the library tree are identified; at least one soft link in each identified cycle is identified; and the at least one soft link in each identified cycle is broken. If a cycle has no soft links, notification is provided indicating that the cycle cannot be broken.

Identifying at least one soft link in each identified cycle comprises, for each link in the cycle, determining the dependent and supporting libraries; and determining if one or more functions in the supporting library are required for initializing the dependent library.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
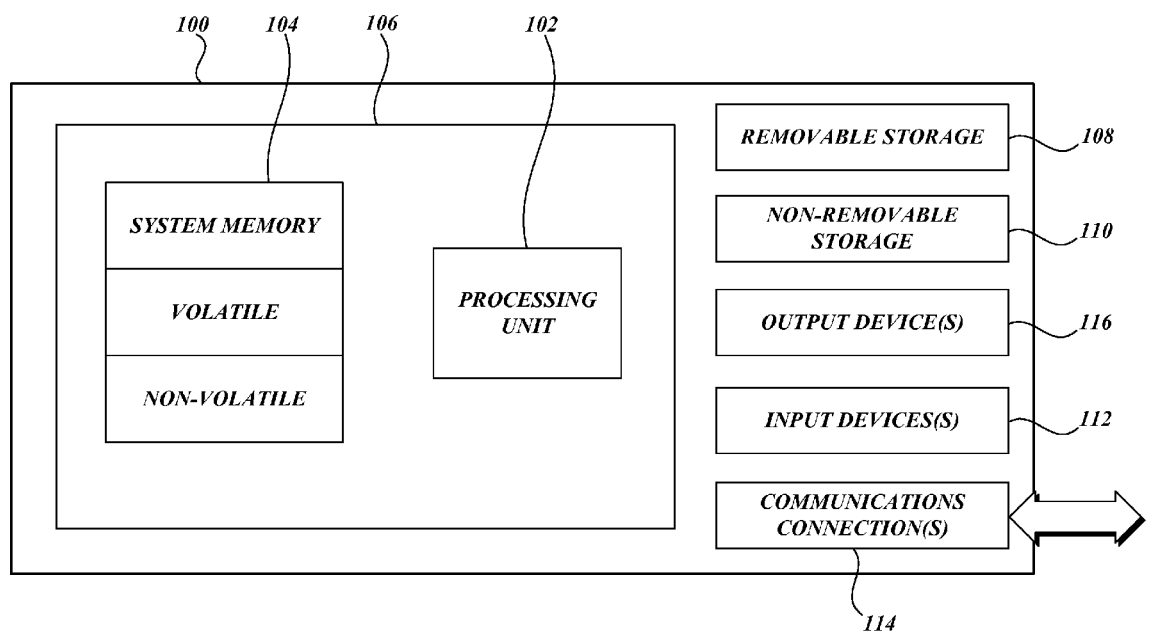
FIG. 1 is a block diagram of an exemplary computing device suitable for performing dynamic library tree cycle resolution.

Libraries are ordered collections of computer software functions that enable more than one software program to use the functions. By making the same functions available to multiple software programs, less memory is used to store instructions. At least as important, if a function needs to be modified, the modification can be done in one software module, i.e., the library, instead of many software modules, i.e., the programs. A function in a library is referred to as a "library function." Typically, each library functions' computer instructions and a reference to each functions' computer instructions are placed in a library. Before a library function's computer instructions can be executed by, for example, an application, the library containing the library function must be located, loaded, and initialized. Initialization usually involves executing instructions that prepare, for example, data structures used by the library functions. Normally, a software module in an operating system called a "loader" provides the library location, loading, and initialization.

Often, a first library function in a first library calls a second library function in a second library. In such a situation, the first library depends on the second library. That is, the first library is a dependent library of the second library. Stated conversely, the second library supports the first library. That is, the second library is a supporting library of the first library. For example, an application may depend on a library A that depends on a library B which depends on a library C. In the example, library C supports library B which support library A and all three libraries, directly or indirectly, support the application.

The dependency relationships described above can be represented in a tree structure, i.e., a library dependency tree or library tree. In a library tree, a node is inserted for each library. Each dependency relationship is represented by a link between the dependent library and the supporting library.

In order to load and initialize the application, libraries A, B, and C must be loaded and initialized in the proper order. The application and its libraries are typically loaded in the order that the application and libraries are discovered, i.e. in top down order. For example, the application is loaded first, then library A, then library B, etc. The application and its libraries are typically are initialized in bottom up order.

During loading, a library is parsed. If, during the parsing of the library, no supporting libraries are discovered, i.e., the library does not depend on other libraries, the loading of the library continues until the loading of the library is completed. If, during the parsing of the library, one or more dependencies are discovered, the loading of the library is paused and supporting libraries are loaded. After the supporting libraries are loaded, the library continues until the loading of the library is completed.

During the loading stage, as each library is parsed, a dependency tree is assembled. For each supporting library, a node is inserted in the dependency tree linked beneath the library that the supporting library supports.

As soon as a library's supporting libraries are loaded, the library can be snapped. The loader uses the dependency tree to determine the snapping order starting with the nodes at the bottom of the dependency tree. Hence, the snapping stage proceeds bottom-up, i.e., from the bottom of the dependency tree to the top of the dependency tree.

As soon as a library is snapped and library's supporting libraries are initialized, the library can be initialized. The loader uses the dependency tree to determine the initialization order starting with the nodes at the bottom of the dependency tree. Hence, the initialization stage proceeds bottom-up.

The order in which the libraries are loaded and initialized, described above, prevents the functions in the libraries from being called before the libraries are properly prepared. If a function in a library is called before the library containing the function is properly prepared, the function and/or the data used by the function may be in an indeterminate state. A function and/or data that is in an indeterminate state can cause, for example, the function to overwrite random memory locations that, in turn, can cause further malfunctions that are often difficult to detect.

Unfortunately, it is also possible for libraries to be co-dependent. For example, if library B depends on library C and library C depends on library B, libraries B and C are co-dependent. That is, there are two links between libraries B and C, which creates a cycle. A cycle is produced if, directly or indirectly, a supporting library for another library is also a dependent library. An indirect cycle is created if, for example, library A depends on library B which depends on library C and library C also depends on library A. In this situation, an indirect cycle is created because library A indirectly depends on library C and library C depends on library A. In the case of a cycle, it is difficult to determine the appropriate initialization order for the libraries, which can lead to an indeterminate state. Note that while the state is indeterminate, the state is legal, i.e., allowable because it may be safe to initialize library A before library C if the initialization functions inside library A do not invoke functions in library C and it may be safe to initialize library C before library A if the initialization functions inside library C do not invoke functions in library A. Unfortunately, it is not possible for an operating system to determine which initialization path is safe when a cyclical dependency exists.

A traditional way to resolve the above-described loading problem is to arbitrarily choose one of the libraries to load first. Often, this has been an adequate solution because library developers have written libraries so that the libraries can be loaded in any order due to the inherent non-determinism in the traditional scheme. This places severe restrictions on developers. For example, library developers must carefully examine the documentation, and code if it is available, of each library to ensure that no dependencies are built into a new library. Often, to eliminate the dependencies, much functionality must be given up. Indeed, in certain cases, designing libraries that can be loaded in any order may not be possible. It is better to resolve cycles in a deterministic fashion that enables operating systems to determine the appropriate loading order for libraries supporting applications. The dynamic library cycle resolution described below provides deterministic cycle resolution.

FIG. 1 is a block diagram that illustrates an exemplary computing device 100 suitable for performing dynamic library cycle resolution. Computing devices capable of running an operating system such as the exemplary computing device 100 include, but are not limited to, desktop computers, servers, laptop computers, cellular telephones, electronic game consoles, microwave ovens, flight control computers, computer driven kiosks, and so on.

The computing device 100 shown in FIG. 1 comprises a basic computing device 106 and various types of peripheral devices with which the basic computing device 106 interacts. The basic computing device 106 comprises a processing unit 102 and a memory unit 104 including system memory, volatile memory, and non-volatile memory. The processing unit 102 may be implemented as one microprocessor, a plurality of microprocessors, a multiple core microprocessor, a plurality of multiple core microprocessors, or other electronic circuitry capable of providing similar computing resources. The memory unit 104 may be implemented by memory devices such as, but not limited to, read-only memory (ROM), programmable read-only memory (PROM), electrically programmable read-only memory (EPROM), electrically erasable and programmable read-only memory (EEPROM), random-access memory (RAM), static random-access memory (SRAM), dynamic random-access memory (DRAM), flash memory or a combination of the aforementioned memory devices. The basic computing device 106 may interact with one or more peripheral devices including, but not limited to, removable storage 108, non-removable storage 110, output device(s) 116, input device(s) 112, and communication connection(s) 114. Removable storage 108 devices include, but are not limited to, removable magnetic disc drives and removable optical disc drives such as compact disc (CD) drives and digital video drives (DVD). Non-removable storage 110 devices include, but are not limited to, magnetic disc drives, optical disc drives, holographic storage units, and so on. Output device(s) 116 include, but are not limited to, liquid crystal displays (LCDs), plasma displays, cathode ray tube (CRT) displays, audio speakers, haptic gloves, haptic seats, digital projectors, and so on. Input device(s) 112 include, but are not limited to, mice, keyboards, electronic pens, microphones, digital cameras, digital video cameras, and so on. Communication connection(s) 114 include, but are not limited to, Ethernet, Token Ring, Fiber Distributed Data Interface (FDDI), Asynchronous Transfer Mode (ATM), Firewire connections, and so on.

Computing devices, such as the exemplary computing device 100 illustrated in FIG. 1 and described above, are often controlled by an operating system. An operating system controlled computing device provides an environment for dynamic library cycle resolution. Certain operating systems provide dynamically linked libraries (DLLs). A dynamically linked library (DLL) is a library that is able to be loaded and initialized while the applications that use the DLL are running. A library tree containing nodes that represent DLLs is a DLL tree. Hence, an implementation of dynamic library cycle resolution is dynamic DLL cycle resolution. Except where noted, hereinafter the terms "library" and "DLL" may be interchanged and the phrases "dynamic library cycle resolution" and "dynamic DLL cycle resolution" may also be interchanged, it being understood that the disclosed subject matter is not limited to DLLs but include other types of linked libraries, including statically loaded libraries.

Figure 2:
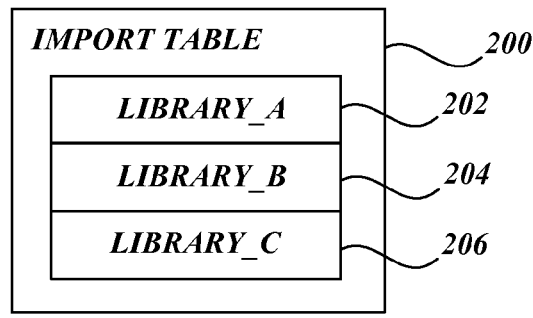
FIG. 2 is a pictorial diagram of an exemplary import table containing exemplary libraries.

An application or a library usually contains an import table that stores references to the libraries on which the application or library depends. A library tree may be formed using the references from the import tables in the applications and libraries. FIG. 2 is a pictorial diagram of an exemplary import table 200. The exemplary import table 200 shown in FIG. 2 contains library reference library_A 202, library reference library_B 204, and library reference library_C 206.

Figure 3:
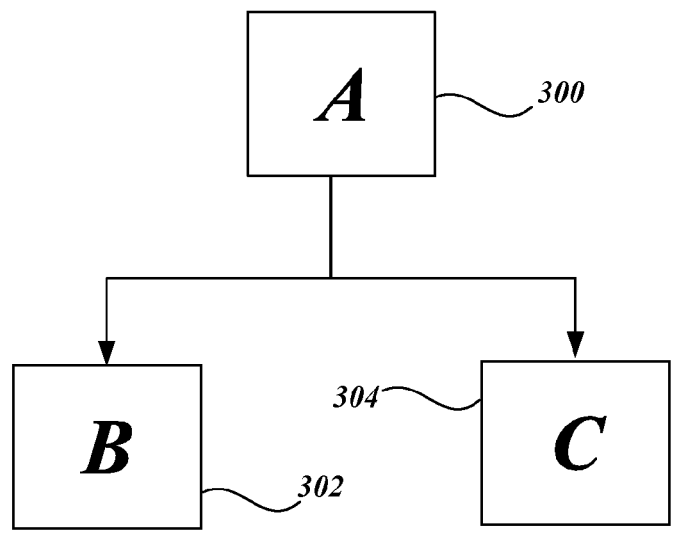
FIG. 3 is a pictorial diagram of an exemplary dependency tree illustrating the dependency relationships of the library shown in FIG. 2.

A library tree may be formed using library references library_A 202, library_B 204, and library_C 206. FIG. 3 is a pictorial diagram of an exemplary dependency tree, i.e., library tree, illustrating an exemplary dependency relationship of three exemplary libraries such as the libraries whose references are stored in the import table 200 shown in FIG. 2. The dependency tree shown in FIG. 3 begins with block A 300, which represents a library such as the library referenced by library reference library_A 202 shown in FIG. 2. A directed link, represented by an arrow pointing down, connects block A 300 with block B 302. The directed link indicates that the library represented by block A 300 depends on the library represented by block B 302. Block A 300 connected to block B 302 by a directed link is an example of a directed dependency relationship. Similarly, a directed link between block A 300 and block C 304 indicates a directed dependency relationship between block A 300 and block C 304. That is, the library represented by block A 300 depends on the libraries represented by block B 302 and block C 304. Stated another way, the libraries represented by block B 302 and block C 304 support the library represented by block A 300.

Figure 4:
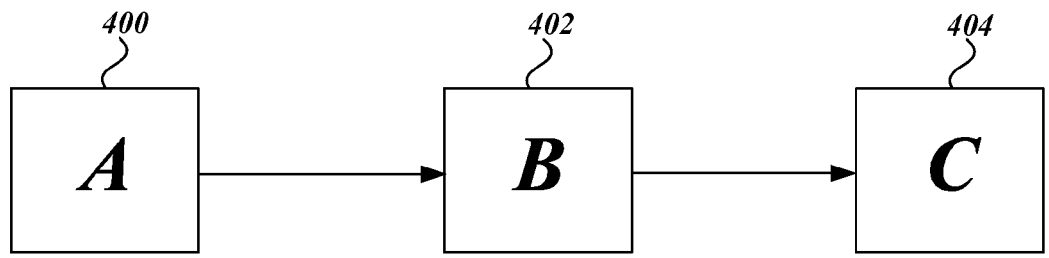
FIG. 4 is a pictorial diagram of an exemplary directed dependency relationship.

FIG. 4 is a pictorial diagram of two exemplary directed dependency relationships. In the directed dependency relationships shown in FIG. 4, block A 400 depends on block B 402 which depends on block C 404. Stated another way, block C 404 supports block B 402 which supports block A 400.

Figure 5:
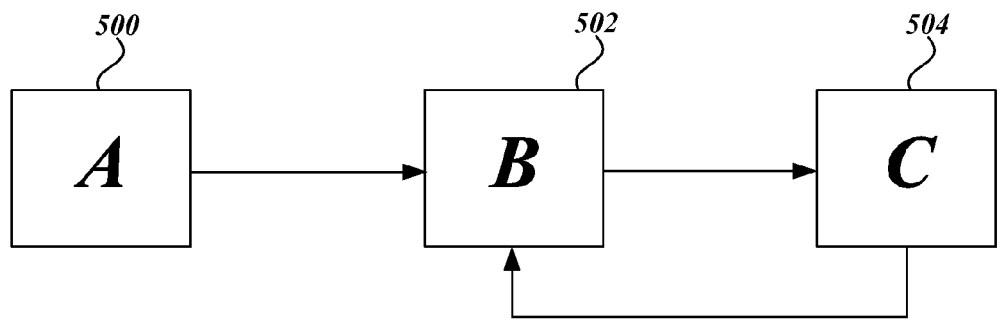
FIG. 5 is a pictorial diagram of an exemplary direct cyclic dependency relationship.

FIG. 5 is a pictorial diagram of an exemplary direct cyclic dependency relationship. In a direct cyclic dependency relationship there is a cyclic dependency relationship between two blocks with no other blocks involved. In the direct cyclic dependency relationship shown in FIG. 5, block A 500 depends on block B 502 which depends on block C 504. Block C 504 also depends on block B 502. Hence, block B 502 supports block C 504 and block C 504 supports block B 502. The two directed links between block B 502 and block C 504 create a cycle between block B 502 and block C 504.

Figure 6:
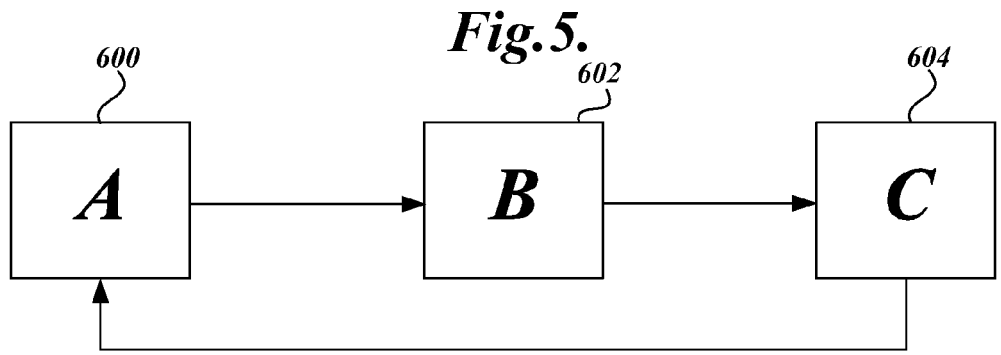
FIG. 6 is a pictorial diagram of an exemplary indirect cyclic dependency relationship.

FIG. 6 is a pictorial diagram of an exemplary indirect cyclic dependency relationship. In an indirect cyclic dependency relationship there is a cyclic dependency relationship between three or more blocks. In the indirect cyclic dependency relationship shown in FIG. 6, block A 600 depends on block B 602 which depends on block C 604. Also, block C 604 depends on block A 600. Because block A 600 depends on block B 602 which depends on block C 604, and block C 604 depends on block A 600, there is an indirect cyclic relationship created. The directed links between block A 600 and block B 602 and block B 602 and block C 604 along with the link between block C 604 to block A 600 creates a cycle.

A part of a solution for resolving cycles in a deterministic fashion that enables determining library loading order is categorizing dependency relationships according to when the dependency relationships are effective. For example, a dependency relationship may be effective during the initialization of a library but not during operation of the application using the library; or, a dependency relationship may not be effective during the initialization of a library but be effective during the operation of the application using the library. An example of the first kind of dependency relationship is one in which a library A depends on a library B because library A needs to call one or more functions in library B during library A's initialization. An example of the second kind dependency relationship is one in which the library A depends on the library B because library A needs to call one or more functions in library B during the operation of the application using library A but not during library A's initialization. These two kinds of dependency relationships are called, respectively, hard and soft dependency relationships. A link that represents a hard dependency is a hard link. Similarly, a link that represents a soft dependency is a soft link. A hard link indicates that the operating system needs to call the initialization routine for the supporting library before calling the initialization routine of the dependent library. No external calls to the library, i.e., no calls from an entity that is not the library itself, can be allowed before the library is initialized. A soft link indicates that the operating system does not need to call the initialization routine of the supporting library before calling the initialization routine of the dependent library. An external call to the library, i.e., a call from an entity that is not the library itself, is allowed during initialization. For example, a soft link from library A to library B indicates that library A's initialization routine does not require the functions in library B to complete. Thus, effectively, library B does not need to be initialized before library A is initialized.

Figure 7:
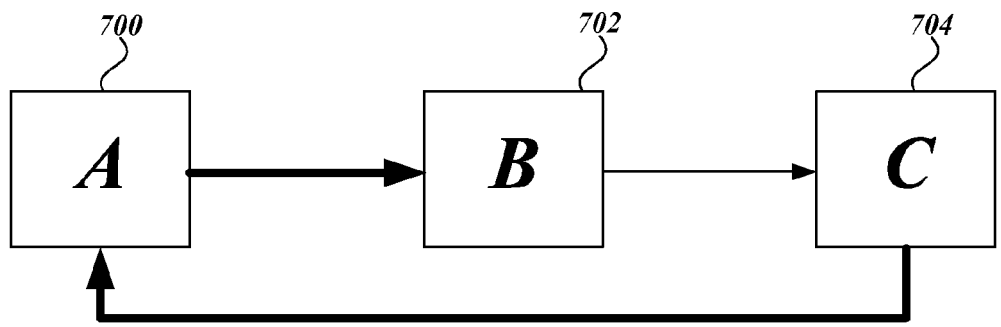
FIG. 7 is a pictorial diagram of an exemplary indirect cyclic dependency relationship with hard and soft links.

FIG. 7 is a pictorial diagram of an exemplary indirect cyclic dependency relationship with hard and soft links. Like the dependency relationship shown in FIG. 6, the dependency relationship in FIG. 7 is also an indirect cyclic dependency relationship. Unlike the dependency relationship shown in FIG. 6, the dependency relationship shown in FIG. 7 depicts a hard link using a heavy line and a soft link using a thinner line. In the dependency relationship shown in FIG. 7, block A 700 has a hard link, depicted by a thick line, to block B 702. Block B 702 has a soft link to block C 704. Block C 704 has a hard link to block A 700.

As stated above, categorizing dependency relationships according to when the dependency relationships are effective is a part of a solution for resolving cycles in a deterministic fashion to enable determining library loading order. A cycle can be resolved if one or more links comprising the cycle can be removed. A soft link can safely be removed during initialization because a soft link indicates that the dependency relationship between two libraries is not effective during initialization. An example of categorizing dependency relationships according to when the dependency relationships are effective, i.e., using hard and soft links, to resolve cycles in a deterministic fashion is illustrated in FIG. 8.

Figure 8:
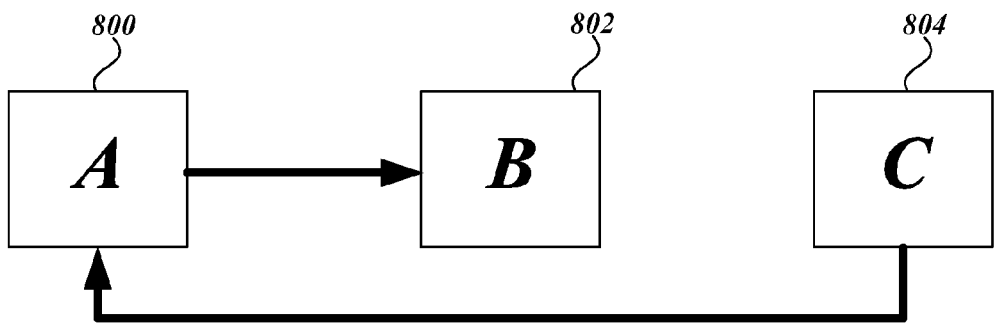
FIG. 8 is a pictorial diagram of the exemplary indirect cyclic dependency relationship shown in FIG. 7 that has been converted to a directed dependency relationship by breaking a soft link.

FIG. 8 is a pictorial diagram of the exemplary indirect cyclic dependency relationship shown in FIG. 7 which has been converted to a directed dependency relationship by removing, i.e., breaking, the soft link between block B and block C. In the dependency relationship shown in FIG. 8, block A 800 has a hard link to block B 802. There is no link between block B 802 and block C 804 because the soft link has been broken. There is a hard link between block C 804 and block A 800. Hence, the dependency relationship between block A 800, block B 802, and block C 804 is a directed dependency relationship.

Figure 9:
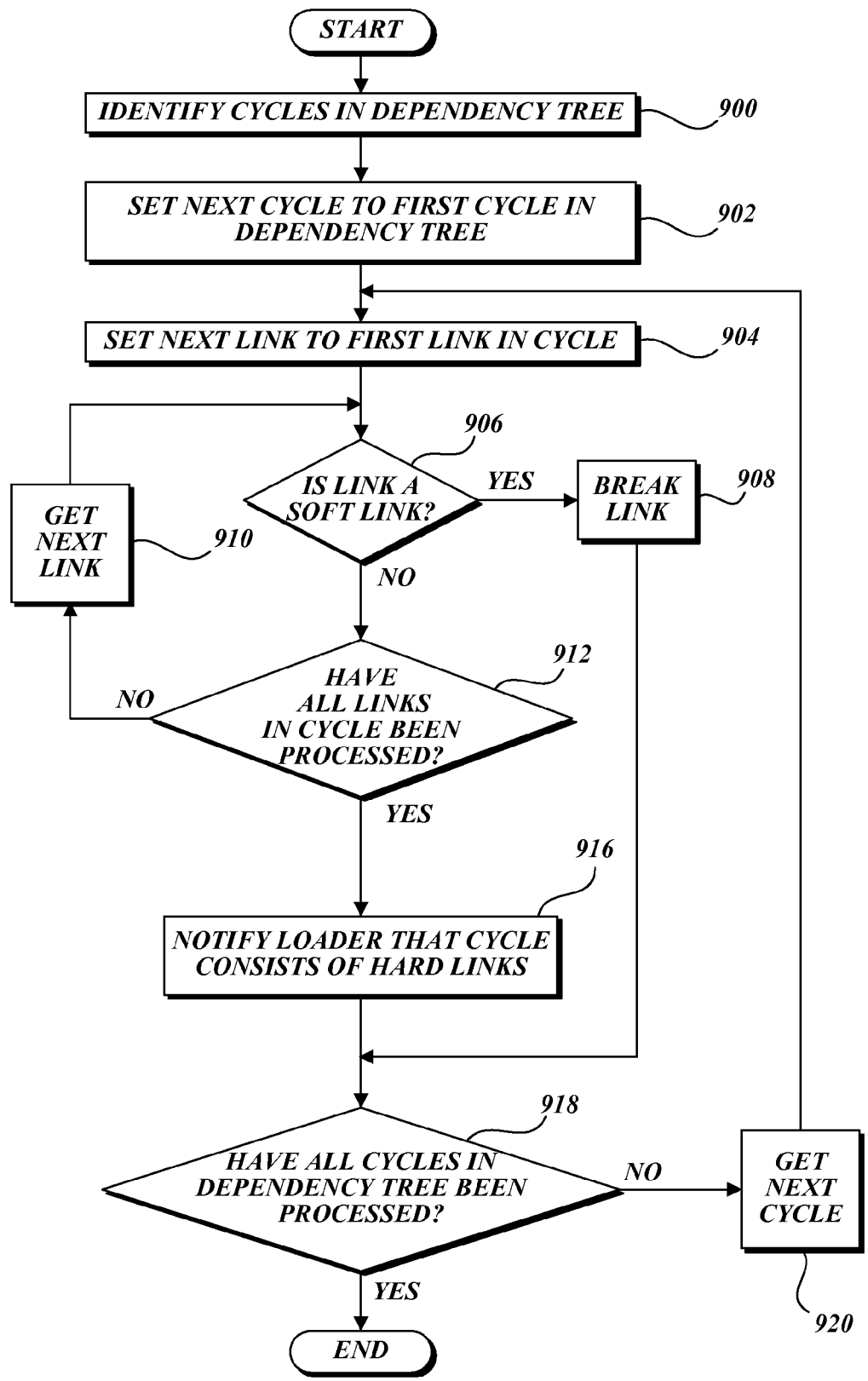
FIG. 9 is a functional flow diagram of an exemplary process for breaking soft links to convert cyclic dependency relationships to directed dependency relationships.

The goal of using hard and soft links to resolve cycles in a deterministic fashion is to ensure that the supporting libraries for a library will be safely initialized before the library itself is initialized. FIG. 9 is a functional flow diagram of an exemplary process for breaking soft links to convert cyclic dependency relationships in a library tree to directed dependency relationships. The process in FIG. 9 begins at block 900 in which the cycles in a dependency tree are identified. At block 902, the first cycle in the dependency tree is set to the next cycle, i.e., the next cycle to be processed. In block 904, the next link, i.e., the next link to be processed, is set to the first link in the cycle. At block 906, a test is made to determine if the next link is a soft link. If the next link is a soft link, the control flows to block 908. At block 908, the link is broken, and control flows to decision block 918. If the next link is not a soft link, the control flows to decision block 912. At decision block 912, a test is made to determine if all the links in the cycle have been processed. If all the links in the cycle have been processed, the control flows to block 916. At block 916, the loader is notified that the cycle consists entirely of hard links and control flows to decision block 918. Using this information, the loader may determine that the cycle cannot be broken and take alternate action. The loader may also have other information that permits the loader to determine that one of the hard links may be broken or that it is somehow safe to break the cycle. If all the links in the cycle have not been processed, the control flows to block 910. At block 910, the next link is obtained, and control flows to decision block 906. At decision block 918, a test is made to determine if all cycles in the dependency tree have been processed. If all of the cycles in the dependency tree have been processed, the process ends. If all of the cycles in the dependency tree have not been processed, control flows to block 920. At block 920, the next cycle is obtained, and control flows to block 904.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for deterministically resolving cycles in a library tree to enable safe library initialization, the method comprising:
with a processor:
identifying the cycles in the library tree;
identifying a soft link in each identified cycle; and
breaking the soft link in each identified cycle.

2. The method of claim 1 including if a cycle has no soft links, providing notification that the cycle cannot be broken.

3. The method of claim 1 wherein identifying at least one soft link in each identified cycle comprises, for each link in the cycle, determining the dependent and supporting libraries; and determining if one or more functions in the supporting library are required for initializing the dependent library.

4. The method of claim 3 including if a cycle has no soft links, providing notification that the cycle cannot be broken.

5. A computer readable storage device containing computing device executable instructions for deterministically resolving cycles in a library tree to enable safe library initialization, that, when executed:
categorize the links between the libraries in the library tree as hard links and soft links;
identify the cycles in the library tree;
if a soft link in each identified cycle exists, identifying the soft link; and
break the soft link in each identified cycle.

6. A computer readable storage device as claimed in claim 5 wherein if a cycle has no soft links, the computer executable instructions provide notification that the cycle cannot be broken.

7. A computer readable storage device as claimed in claim 5 wherein a link between two libraries in the library tree is categorized as a hard link if the first library of the two libraries depends on the second library of the two libraries during the initialization of the first library.

8. A computer readable storage device as claimed in claim 7 wherein if a cycle has no soft links, the computer executable instructions provide notification that the cycle cannot be broken.

9. A computer readable storage device as claimed in claim 5 wherein a link between two libraries in the library tree is categorized as a soft link if the first library of the two libraries does not depend on the second library of the two libraries during the initialization of the first library.

10. A computer readable storage device as claimed in claim 9 wherein if a cycle has no soft links, the computer executable instructions provide notification that the cycle cannot be broken.

11. A computer readable storage device as claimed in claim 9 wherein a link between two libraries in the library tree is categorized as a hard link if the first library of the two libraries depends on the second library of the two libraries during the initialization of the first library.

12. A computer readable storage device as claimed in claim 11 wherein if a cycle has no soft links, the computer executable instructions provide notification that the cycle cannot be broken.

13. A computer readable storage device as claimed in claim 5 wherein a hard link between two libraries indicates that the dependency between the two libraries cannot be broken.

14. A computer readable storage device as claimed in claim 5 wherein a soft link between two libraries indicates that the dependency between the two libraries can be broken.

15. A computer readable storage device as claimed in claim 14 wherein a hard link between two libraries indicates that the dependency between the two libraries cannot be broken.

16. A method for deterministically resolving a cycle in a software tree comprising:
   with a processor:
      identifying the cycle;
      determining if the cycle has a soft link;
      if the cycle has a soft link, breaking the soft link.

17. The method of claim 16 including if a cycle has no soft links, providing notification that the cycle cannot be broken.

18. The method of claim 16 including determining if the cycle has hard links.

19. The method of claim 18 wherein a hard link is a link that cannot be broken.

20. The method of claim 16 wherein a soft link is a link that can be broken.

* * * * *